United States Patent [19]

Sutch

[11] 4,111,622

[45] Sep. 5, 1978

[54] PRODUCTION OF CONTAINERS

[75] Inventor: Brian Leo Chudleigh Sutch, Thames Ditton, England

[73] Assignee: Airfix Industries Limited, London, England

[21] Appl. No.: 749,340

[22] Filed: Dec. 10, 1976

[51] Int. Cl.² .............................................. B29D 3/00
[52] U.S. Cl. ...................... 425/112; 93/36.1; 249/83; 425/129 R; 425/450.1; 425/542
[58] Field of Search ............. 425/112, 127, 129, 542, 425/450.1; 72/133, 166; 164/98, 303, 332; 249/83; 93/36.1, 36.01, 77 CL, 51 R

[56] References Cited

U.S. PATENT DOCUMENTS

| 2,379,971 | 7/1945 | Krehbiel | 249/83 |
| 3,780,559 | 12/1973 | Turner | 425/129 X |
| 3,797,369 | 3/1974 | Amberg | 93/36.01 |
| 3,868,893 | 3/1975 | Sutch | 93/51 R |
| 3,869,234 | 3/1975 | Sutch | 425/112 |
| 3,978,775 | 9/1976 | Buckley et al. | 93/77 CL |

Primary Examiner—Francis S. Husar
Assistant Examiner—Gus T. Hampilos
Attorney, Agent, or Firm—Scrivener, Parker, Scrivener & Clarke

[57] ABSTRACT

Apparatus for making a container by means of a blank which is seamed along two opposite edges when these are juxtaposed includes a cavity tool and a core tool which move from an open to a closed condition to clamp a blank in its final shape whereupon material can be injected to seam the juxtaposed edges, the blank being movable into the cavity tool through a passage extending from the cavity through a wall of the cavity tool by blank drive means and an obturator being provided to close the passage and complete the internal surface of the cavity tool.

10 Claims, 7 Drawing Figures

PRODUCTION OF CONTAINERS

This invention is concerned with improvements in and relating to the production of receptacles or containers and more particularly to apparatus for producing composite containers that is to say containers made from a blank or foil of resilient flexible sheet material, which is shaped to the shape of the container and which has juxtaposed edges seamed by injection moulding.

Composite containers may be made by using apparatus in which foils or blanks, which expressions shall be used to mean resilient flexible sheet material such as paper, card, metal foil or synthetic plastics, are held in a magazine from which they are withdrawn one by one and dropped down one or more guideways until each overlies an aperture in a guide body which defines the longitudinal peripheral wall of a cavity. The part of the foil overlying the aperture is driven through the aperture and the foil comes to rest in the cavity, bearing against the peripheral wall. Then the foil is driven out of the cavity in the longitudinal direction of the cavity and axially into a female mould tool cavity which tool is brought out of the moulding machine for loading with foil.

According to this invention there is provided apparatus for making a receptacle having a peripheral wall extending axially of the receptacle between a closed end and an open end of the receptacle, the apparatus comprising a cavity tool which has a peripheral wall of which the internal surface is shaped to the shape of a peripheral external surface of the receptacle which will be formed by the external surface of a blank, and a core tool receivable by the cavity tool and shaped to define with the cavity tool, when the tools are closed, a blank cavity and a mould cavity, the blank cavity being the shape of the blank when formed to its shape when forming the receptacle and the mould cavity being shaped so that with two juxtaposed edges of the formed blank positioned thereat they will, upon injection of material into the mould cavity, be seamed by the injected material, the tools being relatively movable between an open condition and the closed condition axially relative to the receptacle to be formed, the cavity tool including a passage in the wall of the cavity tool, that passage having an axial extent relative to the container at least as great as the axial extent of the blank relative to the container and having an exit at the internal surface of the cavity tool and an entry, and an obturator movable into and out of the passage and when in the passage closing the passage and forming a part of the internal surface of the cavity tool, blank drive means being provided movable into the passage when open and when the tools are in the open condition, whereby, when a blank is appropriately positioned at the entry of the passage, the blank drive means is operable to drive the blank into the cavity where it will be confined against its inherent resilience by the internal surface of the cavity tool, whereafter, when the tools are in the closed condition and the obturator has closed the passage, injection of material into the mould cavity will seam the juxtaposed edges of the blank and complete base seam means to connect the blank with means forming the closed end of the receptacle.

The obturator may be movable linearly, parallel to the cavity axis of relative movement of the tools, in which case it is mounted on the cavity tool and is movable relative thereto to a closed condition in the same direction relative to the core tool as the direction of relative movement of the cavity tool to the core tool in the closing movement of the tools.

Alternatively the obturator may be pivotally carried by the core tool and be displaceable angularly as the core tool closes to close the passage. Instead of being pivotally mounted on the core tool, the obturator may be linearly movable on the core tool in a direction transverse to the core tool line of travel relative to the cavity tool.

Then again the obturator may be movable into the passage in the direction of feed of the blank and may in fact act as the blank feed device.

In order that the invention may be well understood there will now be described some embodiments, given by way of example only, reference being had to the accompanying drawings, in which.

Figure 1:
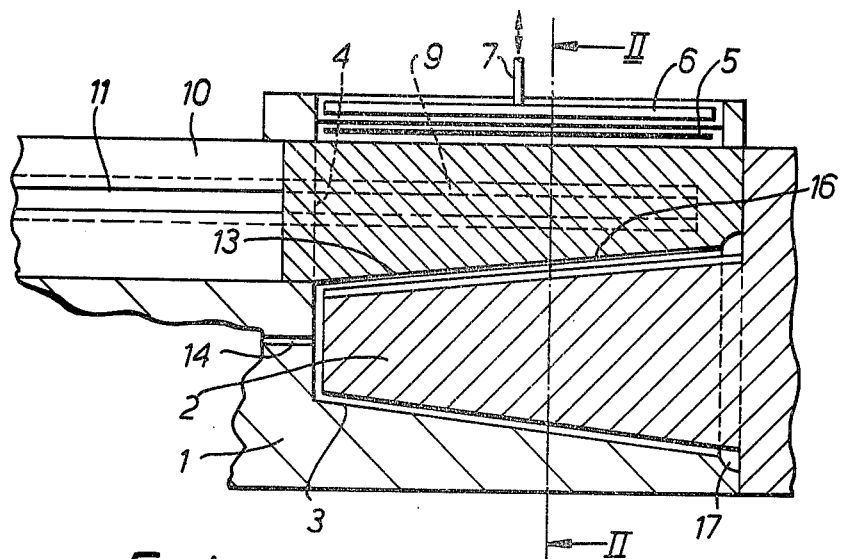
FIG. 1 is a diagrammatic section through the tools of an injection moulding machine with the obturator carried by the cavity tool.
Figure 2:
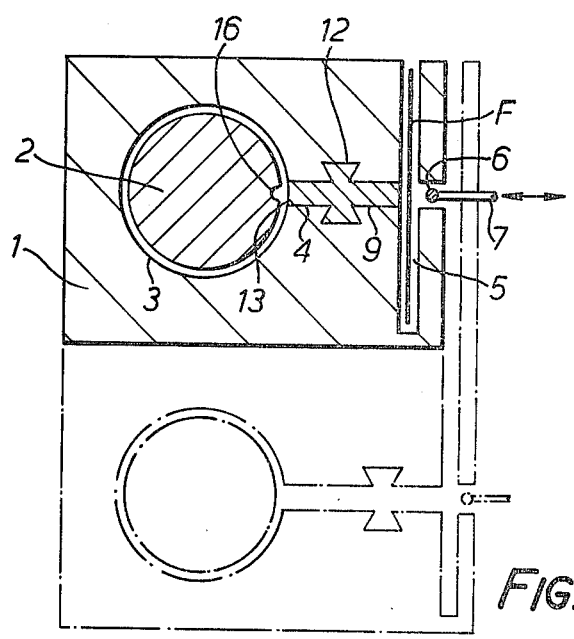
FIG. 2 is a section normal to the cavity tool axis with the tools closed and showing a multi-impression tool.

Referring to FIG. 1 the moulding machine includes a cavity tool 1 and a core tool 2 designed when closed to define a blank cavity therebetween which corresponds to the peripheral wall of the end product and a base cavity corresponding to the closed end of the end product which is here a frusto-conical open ended container or receptacle. The cavity tool peripheral surface 3 is interrupted by an exit of a passage 4 which is radial relative to the cavity. The entry to this passage communicates with a slot or guideway 5 down which a foil blank F for forming the peripheral wall of the container may be dropped so that a mid-portion of the blank overlies or spans the entry to the passage as shown in FIG. 2. The axial extent of the passage relative to the container is at least as great as the axial extent of the blank relative to the container. A finger 6 generally parallel with the cavity axis is movable parallel to itself, as by a piston 7, from a position on that side of the guideway 5 remote from the cavity across the guideway and through the passage and into the cavity. With a foil F in the guideway the finger will drive it into the cavity far enough for the natural resilience of the blank to spring it, from a condition bent about the finger into a condition where it is wholly within the cavity, is opened out to surround the cavity axis and is confined against further opening up by the cavity wall. The finger will return to its start position.

An obturator 9 is mounted in a channel 10 in the cavity tool block, and preferably ribs and grooves such as 11, 12 are provided to position the obturator. This obturator is movable between the closed position shown in which it closes the passage 4, a surface 13 of the obturator then completing the inner surface of the cavity tool, and a position along channel 10 in which it is clear of the passage 4. With the obturator and the tools in the closed condition injection may be effected, for example through gate 14 opening into the base cavity, to form a base and seam the base to the blank and thence by way of suitable channels 16, 17 to form an axially extending seam which will join the juxtaposed edges of the blank and a lip respectively in the finished product. Additional channels may be provided for the formation of further axially extending ribs if desired.

The rib 11 and groove 12 which position the obturator relative to the cavity tool body assist in resisting radial load applied to the obturator during injection moulding.

In FIG. 2 is shown in broken lines a second cavity and core tool and a second obturator to indicate that the invention is applicable to multi-impression tools. Each impression has its own blank feed passage but a common passage could be used for superposed cavities. The finger piston for the upper cavity or cavities must withdraw far enough to clear the foil passage or passages of the lower cavity or cavities. Additionally or alternatively cavities can be positioned side-by-side with their foil fingers movable inwardly from opposite sides of the tool block.

Figure 3:
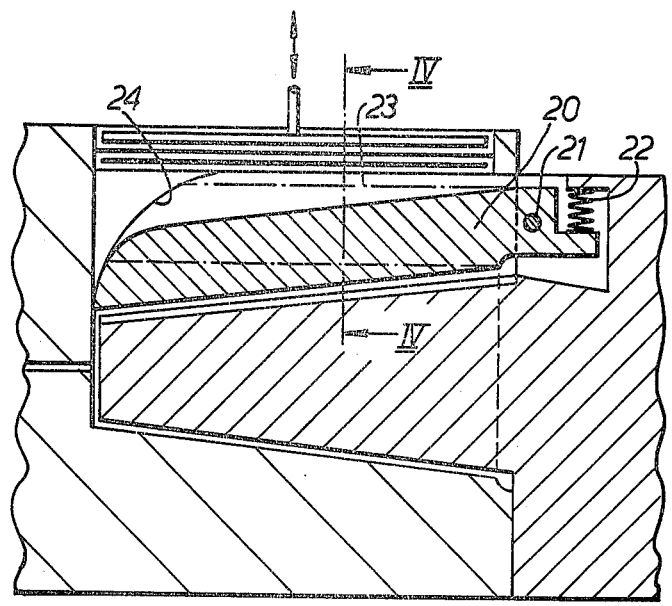
FIG. 3 is a diagrammatic section through the tools of an injection moulding machine with the obturator mounted for pivotal movement on the core tool.
Figure 4:
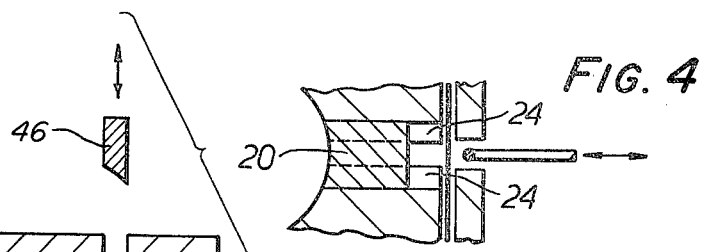
FIG. 4 is a detail section on the line IV—IV of FIG. 3 across the foil passage of the cavity tool of FIG. 3.

Referring now to FIG. 3, an obturator 20 is shown, pivoted at 21 to the core tool and biased by a spring 22. The walls of blank passage 23 in the cavity tool body includes a pair of cam tracks 24. When the tools are in the open condition the obturator is in the attitude shown in broken lines relative to the core tool. When the tools close the obturator head enters the passage. The obturator will span the passage and the cam tracks 24 which will cause the obturator to pivot to a final position completing the cavity internal surface. The cam tracks will furthermore hold the obturator against radial displacement during injection since the tools will be firmly pressed together in the axial direction.

Figure 5:
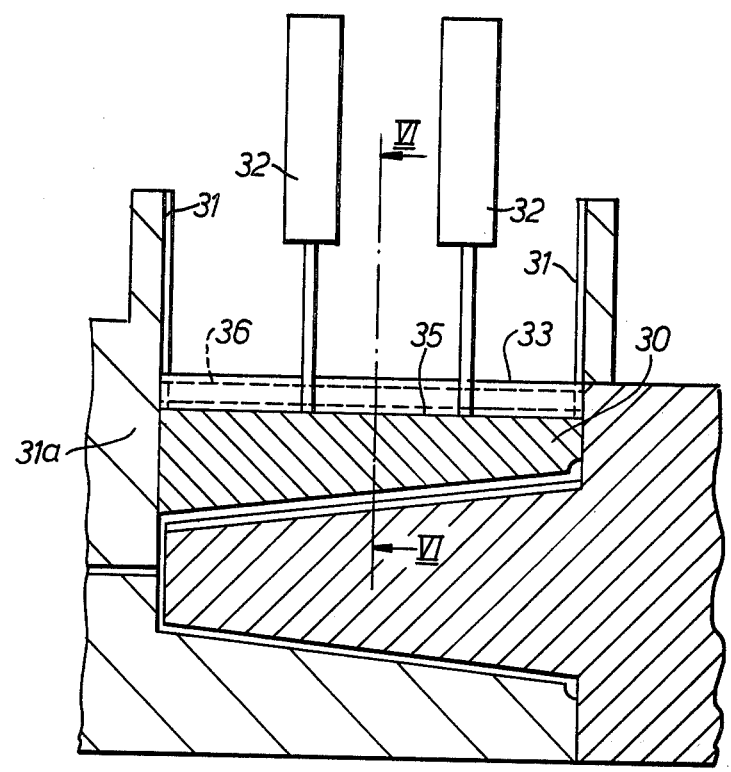
FIG. 5 is a section through the tools of an injection moulding machine with the obturator acting as a foil feeder.
Figure 6:
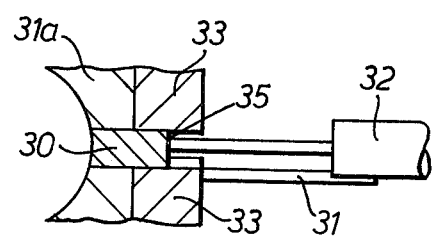
FIG. 6 is a scrap section along line VI—VI of FIG. 5.

Referring now to FIG. 5, an obturator 30 is provided movable in guideway 31 of the cavity tool body 31a in a direction transverse to the direction of relative movement of the tools. Actuation of the obturator may be effected in any suitable way such as by pistons and cylinders 32 and to lock the obturator in the position completing the internal surface of the cavity, the apparatus may include a suitable lock or support for the obturator in the position completing the cavity wall surface. For example the core tool may carry a pair of support members 33 to engage outwardly directed surface 35 on the obturator as the tools close. A blank slot 36 may be interrupted by support members 33 as the tools close or lie outside the path of the support members.

While only a single impression tool has been described in relation to FIGS. 3 to 6 a multi-impression tool can be provided in those cases as explained with reference to FIG. 2.

Also instead of using a radial passage for the blank and a finger engaging a mid-part of the blank, the blank may be fed tangentially to the cavity through the passage by a suitable push member operating through the passage which may be the obturator itself.

Figure 7:
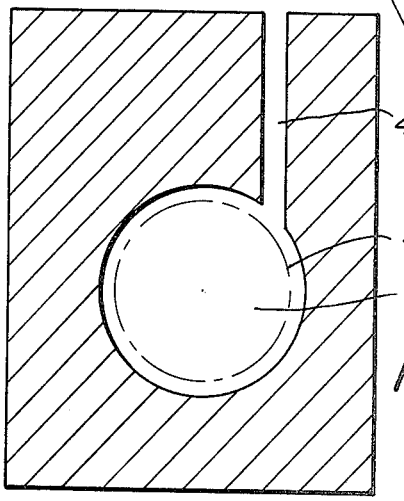
FIG. 7 is a section through the cavity tool of an injection moulding machine with the obturator acting as a foil feeder through a tangential passage.

Such an arrangement is shown in FIG. 7 wherein a foil 40 is fed through a tangential blank guide passage 43 leading into the cavity 44. The obturator 46 is adapted to engage the foil 40 and move it fully into the cavity 44 after which the obturator 46 closes the passage 43 and functions as described for the other embodiments.

What we claim is:

1. Apparatus for making a receptacle having a peripheral wall extending axially of the receptacle between a closed end portion and an open end thereof, the apparatus comprising a cavity tool having a peripheral wall, the internal surface of said cavity tool peripheral wall forming a blank cavity corresponding to the external surface of a receptacle to be formed therein from a blank, and a core tool receivable by the cavity tool to form a mould cavity, the tools being movable between an open position and a closed position such that when the tools are in the closed position, a blank placed in the cavity tool is so formed that two juxtaposed edges extending axially of the cavity tool will be seamed upon injection of material into the mould cavity, the cavity tool including a passage in the peripheral wall of the cavity tool, said passage extending axially relative to the cavity tool peripheral wall internal surface a length at least as great as the axial extent of a blank formed therein and being provided with an entrance remote from the internal surface of the cavity tool peripheral wall and an exit at the internal surface of the cavity tool peripheral wall, an obturator operatively associated with the cavity tool passage and movable between an open and closed position such that the obturator forms a part of the internal surface of the cavity when in the closed position, means operatively associated with the cavity tool passage entrance for positioning a blank to be driven into the blank cavity of the cavity tool, blank drive means operatively associated with the cavity tool and movable into the cavity tool passage for driving a positioned blank into the cavity of the cavity tool, the blank drive means being operable to drive a blank into the blank cavity where it remains confined against its inherent resilience by the internal surface of the cavity tool, and an injection passage associated with the mold cavity, whereafter, when the core tool and cavity tool are in a closed position forming the mold cavity and the obturator is in the closed position, injection of material through the injection passage and into the mold cavity will seam the juxtaposed edges of the blank and seam a member forming the closed end of the receptacle to the blank.

2. Apparatus according to claim 1, in which the obturator is movable parallel with the direction of relative movement of the tools.

3. Apparatus according to claim 2, in which the obturator is slidably received in a guideway in the cavity tool.

4. Apparatus according to claim 3, in which the obturator and guideway include ribs interengaging in a direction to resist outward displacement of the obturator transverse to the direction of relative movement of the tools.

5. Apparatus according to claim 1 in which the obturator is pivotal and camming means are provided in the guide operable to pivot the obturator to the closed condition to resist outward displacement of the obturator transverse to the direction of relative movement of the tools.

6. Apparatus according to claim 1, in which the obturator is movable transversely to the direction of relative movement of the tools into and out of the passage.

7. Apparatus according to claim 6, in which means are provided positionable against outwardly directed means on the obturator to resist outward displacement of the obturator transverse to the direction of relative movement of the tools.

8. Apparatus according to claim 1 in which the passage is radial to the cavity tool cavity and the means to drive the blank comprise a finger movable parallel with itself through the passage.

9. Apparatus according to claim 1 in which the passage is tangential to the cavity tool cavity.

10. Apparatus according to claim 9, in which the obturator is movable to drive the foil into the cavity.

* * * * *